(12) United States Patent
Xin et al.

(10) Patent No.: US 9,880,585 B2
(45) Date of Patent: Jan. 30, 2018

(54) ELECTRONIC DEVICE

(71) Applicant: Lenovo (Beijing) Co., Ltd., Beijing (CN)

(72) Inventors: Zhifeng Xin, Beijing (CN); Xiaosong Xia, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 112 days.

(21) Appl. No.: 14/829,906

(22) Filed: Aug. 19, 2015

(65) Prior Publication Data

US 2017/0023972 A1   Jan. 26, 2017

(30) Foreign Application Priority Data

Jul. 21, 2015  (CN) .......................... 2015 1 0432394

(51) Int. Cl.
  *G06F 1/16*  (2006.01)
(52) U.S. Cl.
  CPC .......... *G06F 1/1618* (2013.01); *G06F 1/1641* (2013.01); *G06F 1/1643* (2013.01); *G06F 1/1652* (2013.01); *G06F 1/1654* (2013.01); *G06F 1/1681* (2013.01)
(58) Field of Classification Search
  CPC .... G06F 1/1652; G06F 1/1618; G06F 1/1616; G06F 1/1681
  See application file for complete search history.

(56) References Cited

U.S. PATENT DOCUMENTS

| | | | |
|---|---|---|---|
| 8,830,215 B2 * | 9/2014 | Ono | G06F 3/038 345/204 |
| 2013/0076597 A1 * | 3/2013 | Becze | G06F 3/1438 345/1.3 |
| 2013/0329394 A1 * | 12/2013 | Nonaka | G06F 1/1616 361/807 |
| 2014/0313102 A1 * | 10/2014 | Hennelly | G06F 1/32 345/1.3 |
| 2016/0085271 A1 * | 3/2016 | Morrison | G06F 1/1681 361/679.27 |
| 2016/0334836 A1 * | 11/2016 | Hong | G06F 1/1616 |

* cited by examiner

*Primary Examiner* — Abbas Abdulselam
(74) *Attorney, Agent, or Firm* — Brinks Gilson & Lione; G. Peter Nichols

(57) ABSTRACT

The present disclosure provides an electronic device that includes a first body, a second body, a rotating mechanism, an enclosing mechanism, and a flexible display screen. The first body and the second body are pivotally connected by the rotating mechanism, and the enclosing mechanism encloses the rotating mechanism. The flexible display screen is arranged on the enclosing mechanism. The electronic device according to the present disclosure can add an auxiliary display device, i.e. a flexible display screen, apart from main display devices, and according to different settings, the auxiliary display device can achieve an external image output independent from the main display device, and can also achieve a larger area image output than that of the main display device.

14 Claims, 5 Drawing Sheets

ELECTRONIC DEVICE

This application claims priority to Chinese patent application No. 201510432394.2 filed on Jul. 21, 2015, the entire contents of which are incorporated herein by reference.

The present disclosure relates to an electronic device. More particularly, the present disclosure relates to an electronic device comprising a small flexible display screen.

BACKGROUND

Existing electronic devices, such as laptops, tablet computers, can generally include two parts, one part for a display portion, another part for a system portion, and the system portion and the display portion are pivotally connected by a pivotal connection portion. The pivotal connection portion is provided with a rotating mechanism. Or two parts included by the electronic device are a first display portion and a second display portion, respectively, and two display portions are pivotally connected by a pivotal connection portion. The pivotal connection portion is provided with a rotating mechanism. There are still some improvement requirements of such electronic devices, to provide better appearance and more functions.

SUMMARY

According to the electronic device of the present disclosure, its technical solutions are as following:

An electronic device, wherein the electronic device includes a first body, a second body, a rotating mechanism, an enclosing mechanism and a flexible display screen, the first body and the second body being pivotally connected by the rotating mechanism, the rotating mechanism being enclosed by the enclosing mechanism, the flexible display screen being arranged on the enclosing mechanism.

BRIEF DESCRIPTION OF THE DRAWINGS

Other features and advantages of the present disclosure will appear from the follow specific embodiments, which are given by not limiting examples and are shown by the appended drawings, in which.

Figure 1:
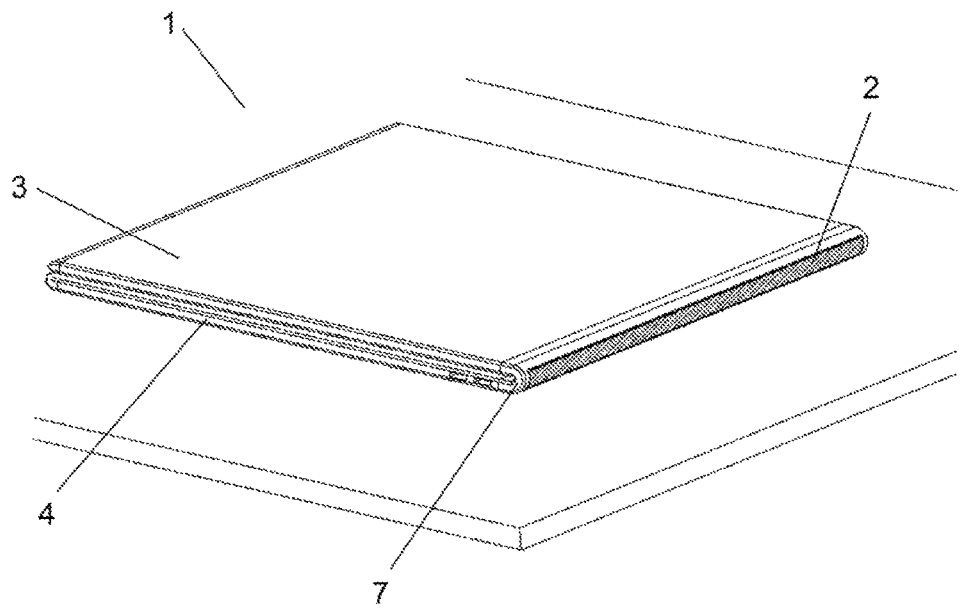
FIG. 1 is a first schematic diagram of an electronic device according to the present disclosure.

EXPLANATION OF REFERENCE NUMERALS 1 electronic device
2 first flexible display screen
3 first body
4 second body
5 second flexible display screen
6 rotating mechanism
7 enclosing mechanism
8 keyboard
9 first display portion
10 second display portion

DETAILED DESCRIPTION

According to an electronic device of the present disclosure, in the case that the user does not open or see a display portion, a flexible display screen included by the electronic device can be set to display some important information, such as e-mail content, number of messages, weather etc., according to the user's requirements, so, in the case of closing the electronic device, the user can receive desired information from outside of the electronic device through a flexible display screen.

Further, according to the electronic device of the present disclosure, a flexible display screen included by the electronic device can display fight score, time, tips etc. of fight against game type or other application type to the user, when the electronic device, such as laptop, is opened at angle of 180 degrees. An electronic device according to the present disclosure is described in detail in connection with below FIGS. 1-17.

FIG. 1 shows an electronic device 1 including a first body 3, a second body 4, a rotating mechanism (see FIG. 3), an enclosing mechanism 7 and a first flexible display screen 2. The first body 3 and the second body 4 are pivotally connected by the rotating mechanism. The enclosing mechanism 7 encloses the rotating mechanism, and the first flexible display screen 2 is arranged outside of the enclosing mechanism 7.

In an embodiment shown in FIG. 1, the flexible display screen is arranged outside of the enclosing mechanism.

The flexible display screen is arranged on the electronic device and is arranged on the enclosing mechanism which encloses the rotating mechanism, so that, when the first body and the second body of the electronic device are closed together, the flexible display screen located outside of a rotating shaft can display some information, such as new arrival e-mail, time, received new message etc. which the user expect can be easily seen in the case of unopening the electronic device.

In an embodiment, for example, the electronic device is a regular laptop, then the first body 3 includes a first display portion, such as a display, and the flexible display screen is independent from the first display portion.

The content shown by the flexible display screen is independent from the first display portion, such that the flexible display screen can display the user preset desired contents, which are different from the contents shown by the display.

Figure 2:
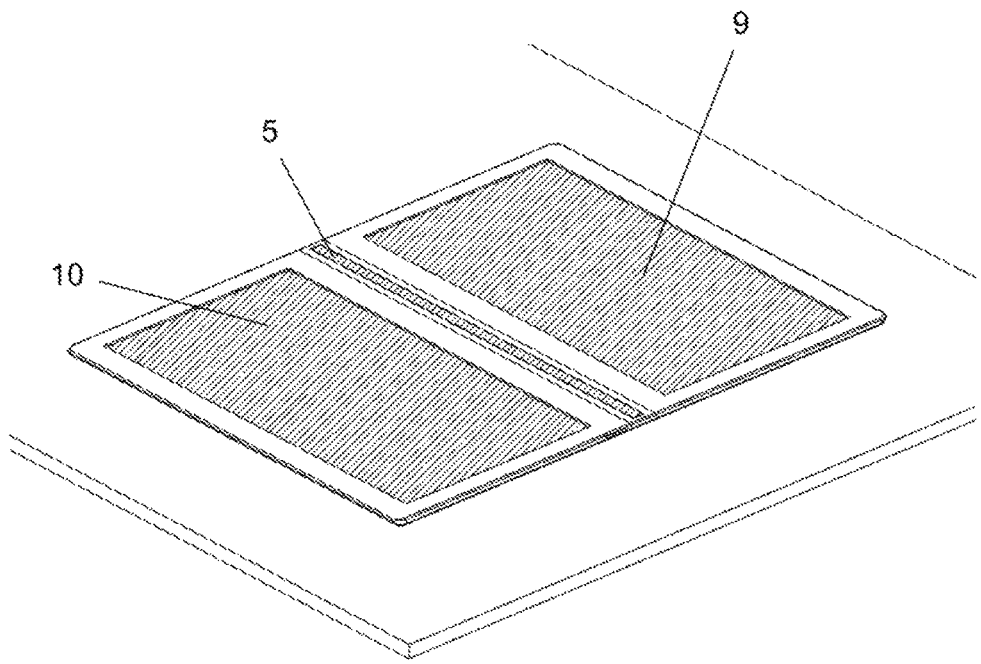
FIG. 2 is a second schematic diagram of an electronic device according to the present disclosure.

FIG. 2 shows an electronic device according to the present disclosure, the electronic device including two main display portions, that is, a first display portion 9 and a second display portion 10. In an embodiment shown in FIG. 2, this electronic device includes a first display portion 9 and a second display portion 10, and a second flexible display screen 5 is disposed between the first display portion 9 and the second display portion 10.

The either side of the rotating mechanism of the electronic device is provided with a display screen, that is, a first display portion and a second display portion, and the flexible display screen is disposed between the first display portion and the second display portion, which has many advantages as following. The contents shown by the flexible display screen are independent from the contents shown by the first display portion and the second display portion. When the first display portion and the second display portion are opened at 180 degrees, an angle of as shown in FIG. 2, the first display portion is set as a touch screen and the second display portion is also set as a touch screen. At this time, the first display portion and the second display portion can service as two interfaces of fright against game, while the flexible display screen located in intermediate of the first and second display portions can display the fright against information, such as score. Of course, setting it as the interface of fright against game and a score display is only one of functions which can achieve and is not as a limitation to the present disclosure.

In addition, if the contents shown by the flexible display screen, the first display portion, and the second display portion are integrated into a whole, that is, the first display portion, the flexible display screen, and the second display portion can become a whole display screen (not shown) to output a complete image, which significantly increases the area of output image of display portion, and improve the visual experience.

Figure 3:
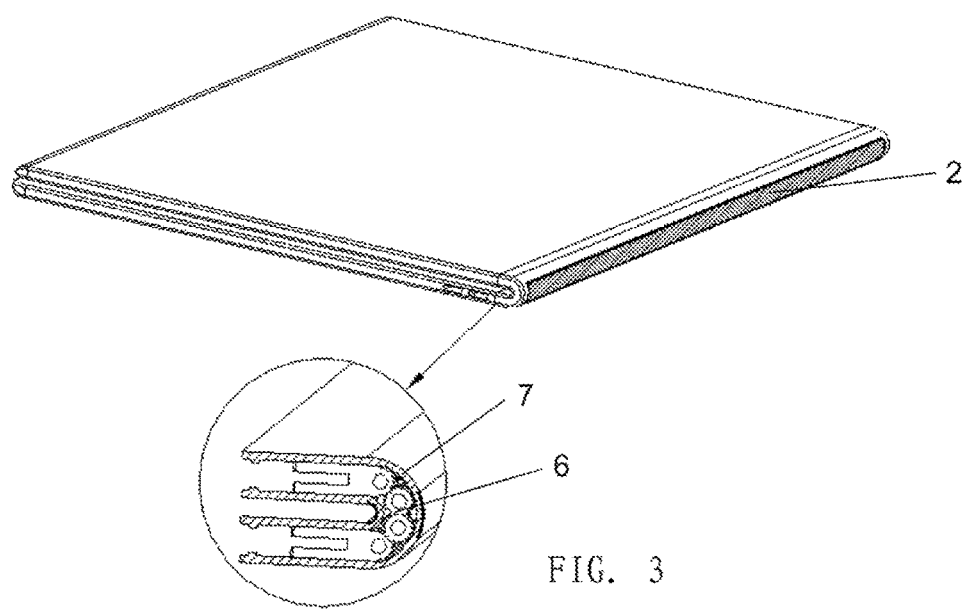
FIG. 3 is a schematic diagram of the same electronic device of the present disclosure as shown in FIG. 1, wherein a rotating mechanism and an enclosing mechanism are enlarged.
Figures 4, 5, 6:
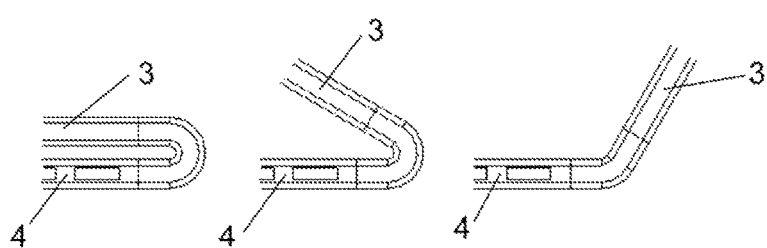
FIG. 4 is a partial schematic diagram of an electronic device according to the present disclosure, wherein a first body and a second body are located in one relative position.
FIG. 5 is a partial schematic diagram of an electronic device according to the present disclosure, wherein a first body and a second body are located in a relative position different than FIG. 4.
FIG. 6 is a partial schematic diagram of an electronic device according to the present disclosure, wherein a first body and a second body are located in a relative position different than FIG. 4 and FIG. 5.

FIG. 3 shows a rotating mechanism and an enclosing mechanism, which are enlarged. FIGS. 4-6 show a partial electronic device according to the present disclosure, wherein a first body and a second body are located in different relative positions.

As seen from FIGS. 3-6, in the process of turning the rotating mechanism 6, that is, regardless of the relative position of the first body 3 and the second body 4, the enclosing mechanism 7 will tightly fit the rotating mechanism 6. In other invention patent applications filed on the same day by the applicant how to achieve the technical effect of above tight fitting has been described in detail, which is not repeated here.

Figure 7:
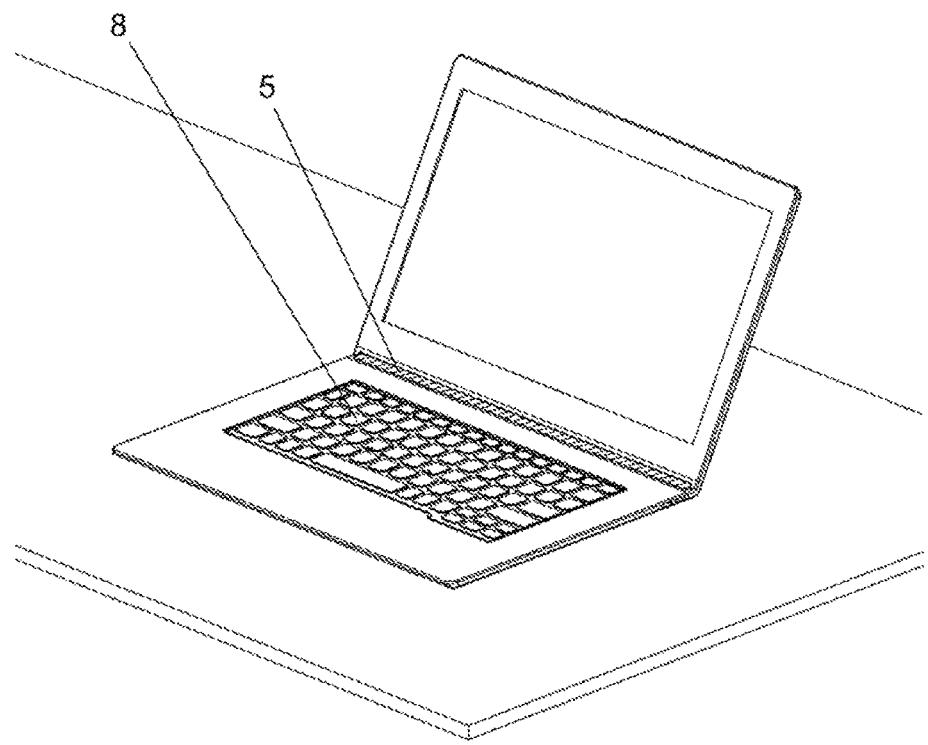
FIG. 7 is a third schematic diagram of an electronic device according to the present disclosure.

FIG. 7 shows an electronic device according to the present disclosure, which includes a keyboard 8. In the embodiment shown in FIG. 7, a second flexible display screen 5 is arranged on a side of an enclosing mechanism adjacent to the keyboard, that is, inside of a rotating mechanism of the electronic device, in other words, which is disposed between a display portion and the keyboard, and the second flexible display screen, the display portion and the keyboard are arranged on the same side. Although not shown in FIG. 7, the flexible display screen can also be arranged on a side of the enclosing mechanism opposite to the keyboard, that is, outside of the rotating mechanism of the electronic device, such as the first flexible display screen 2 shown in FIG. 1 being arranged outside of the electronic device.

The flexible display screen can be located inside of the rotating mechanism of the electronic device, and the flexible display screen can also be located outside of the rotating mechanism. The flexible display screen can not only be arranged inside of the rotating mechanism of the electronic device but also be arranged outside of the rotating mechanism of the electronic device With pivot of the rotating mechanism, the enclosing mechanism rotates, in this process, the enclosing material used by the enclosing mechanism can be tightened or relaxed, in order to make the enclosing material always fit the rotating mechanism, the enclosing mechanism will include a first elastic portion, so that the enclosing mechanism may be stretched or retracted as needed, it having elasticity, while the flexible display screen has no elasticity, but has flexibility, in order to make the flexible display screen arranged outside of the enclosing mechanism always fit the enclosing mechanism, thus, the enclosing mechanism will include a second inelastic portion, Which only has flexibility, and has no elasticity, the flexible display screen disposed on the second inelastic portion, so that, in the movement of the enclosing mechanism with pivot of the rotating mechanism, the flexible display screen always fit the cover mechanism, thereby always fit the rotating mechanism.

Further, the enclosing mechanism is fixed between the first body and the second body after the first elastic portion of the enclosing mechanism is pre-stretched, and the enclosing mechanism always fit the rotating mechanism when the rotating mechanism is rotated to different angles.

Moreover, the flexible display screen may include a plurality of display assembly, the plurality of display assembly are arranged on the enclosing mechanism, wherein each display assembly has an independent display function.

When the flexible display screen includes a plurality of display assembly, each display assembly can display the content independently, and can also display the overall content. The user can control the output image of the flexible display screen as needed. The display assembly may be a flexible display assembly.

The electronic device in present disclosure may be a laptop or a tablet computer.

Figure 8:
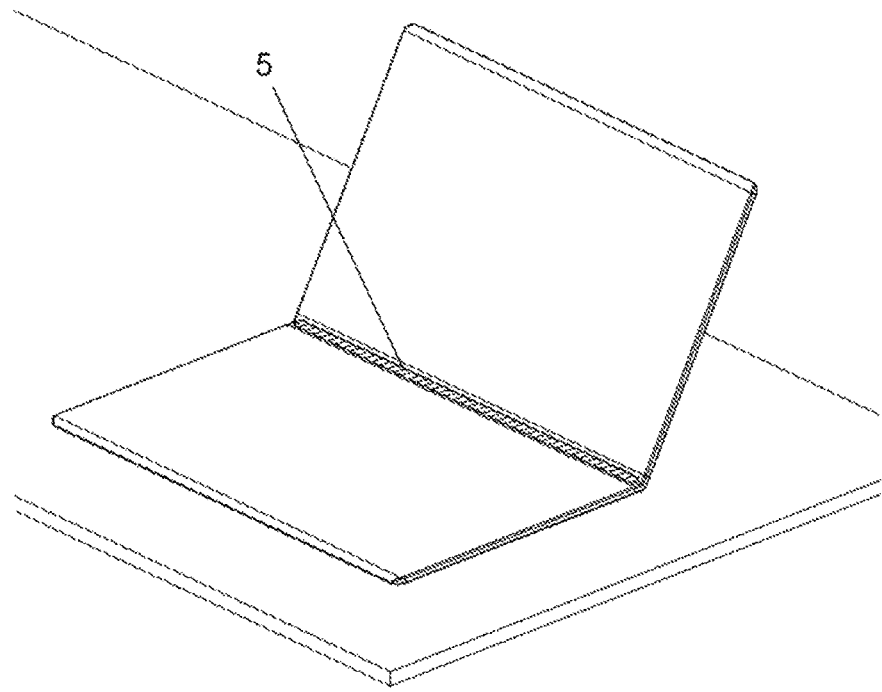
FIG. 8 is a fourth schematic diagram of an electronic device according to the present disclosure.
Figures 9, 10:
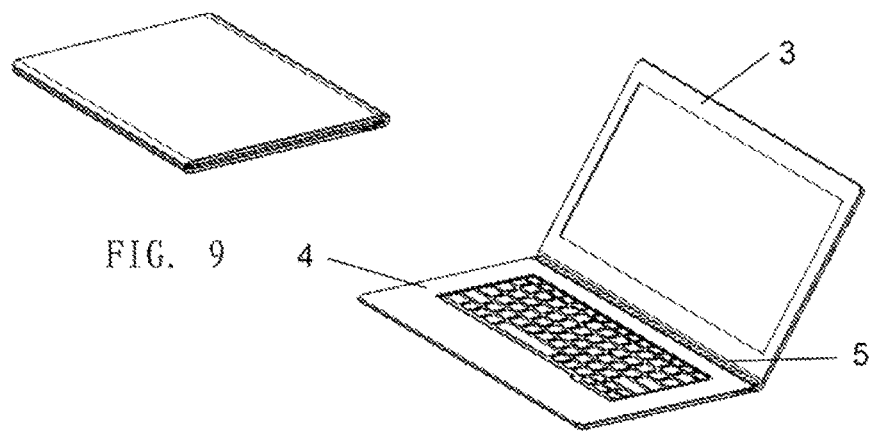
FIG. 9 shows an electronic device according to the present disclosure, wherein a flexible display screen is arranged inside of the electronic device with a first body and a second body of the electronic device being located in one relative position.
FIG. 10 shows an electronic device according to the present disclosure, wherein a flexible display screen is arranged inside of the electronic device with a first body and a second body of the electronic device being located in one relative position.
Figure 11:
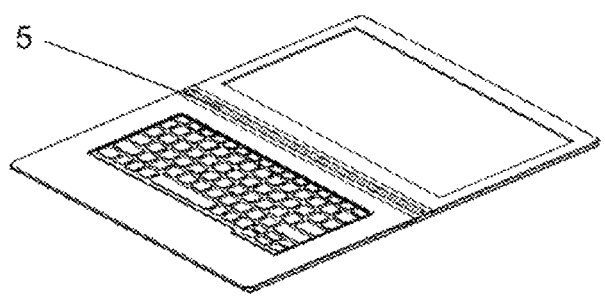
FIG. 11 shows an electronic device according to the present disclosure, wherein a flexible display screen is arranged inside of the electronic device with a first body and a second body of the electronic device being located in one relative position.
Figure 12:
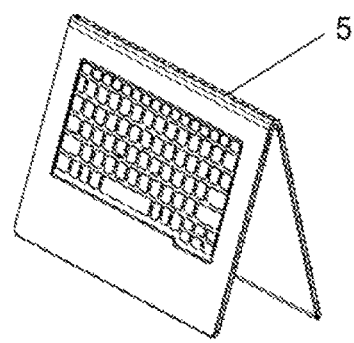
FIG. 12 shows an electronic device according to the present disclosure, wherein a flexible display screen is arranged inside of the electronic device with a first body and a second body of the electronic device being located in one relative position.
Figure 13:
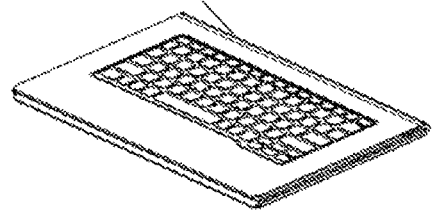
FIG. 13 shows an electronic device according to the present disclosure, wherein a flexible display screen is arranged inside of the electronic device with a first body and a second body of the electronic device being located in one relative position.
Figure 14:
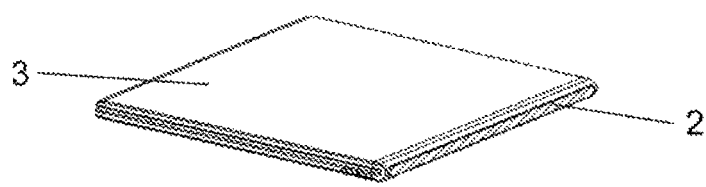
FIG. 14 shows an electronic device according to the present disclosure, wherein a flexible display screen is arranged both inside and outside of the electronic device, with the first body and the second body of the electronic device being located in different relative positions.
Figure 15:
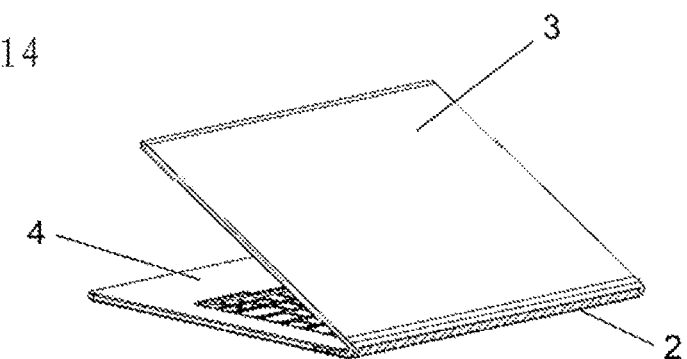
FIG. 15 shows an electronic device according to the present disclosure, wherein a flexible display screen is arranged both inside and outside of the electronic device, with the first body and the second body of the electronic device being located in different relative positions.
Figure 16:
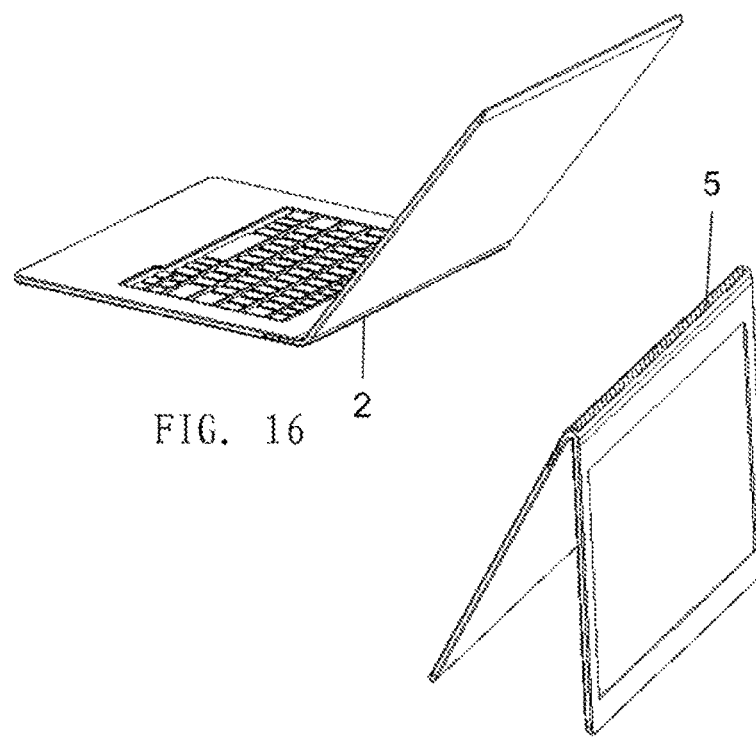
FIG. 16 shows an electronic device according to the present disclosure, wherein a flexible display screen is arranged both inside and outside of the electronic device, with the first body and the second body of the electronic device being located in different relative positions.
Figure 17:
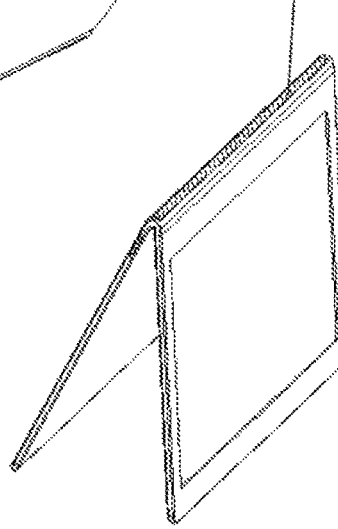
FIG. 17 shows an electronic device according to the present disclosure, wherein a flexible display screen is arranged both inside and outside of the electronic device, with the first body and the second body of the electronic device being located in different relative positions.

FIG. 8 is a simplified schematic diagram of an electronic device according to the present disclosure.

FIGS. 9-13 shows an electronic device according to the present disclosure, wherein a second flexible display screen 5 is arranged inside of a rotating mechanism of the electronic device, that is, on a side adjacent to a keyboard. The angles between a first body 3 and a second body 4 of the electronic device are 0 degrees, 120 degrees, 180 degrees, 270 degrees and 360 degrees, respectively.

FIGS. 14-17 shows an electronic device according to the present disclosure, wherein a first flexible display screen 2 is arranged outside of a rotating mechanism of the electronic device, that is, on a side opposite to a keyboard; a second flexible display screen 5 is arranged inside of the electronic device, that is, on a side adjacent to a keyboard. The angles between a first body 3 and a second body 4 of the electronic device are 0 degrees, 30 degrees, 120 degrees and 270 degrees, respectively.

In each state shown in FIGS. 9-17, the flexible display screen always fit the enclosing mechanism.

The electronic device can be a laptop or a tablet computer.

The electronic device according to the present disclosure can add an auxiliary display device, i.e. a flexible display screen, apart from main display devices, i.e. a first display portion and a second display portion, and according to different settings, the auxiliary display device can achieve an external image output independent from the main display device, and can also achieve a larger area image output than that of the main display device.

Although the present invention has been described in detail, according to the idea of an embodiment of the present disclosure, the changes in the specific embodiments and applications should be considered within the claimed scope of the present disclosure by a person skilled in the art, in summary, contents of this specification should not be construed as limiting the present disclosure.

The invention claimed is:

1. An electronic device comprising: a first body that includes a first display portion; a second body; a rotating mechanism pivotally connecting the first body and the second body; an enclosing mechanism enclosing the rotating mechanism; and a flexible display screen being arranged on the enclosing mechanism and being independent from the first display portion, wherein the enclosing mechanism comprises a first elastic portion and a second inelastic portion, with the flexible display screen being arranged on the second inelastic portion, wherein the enclosing mechanism is fixed between the first body and the second body after the first elastic portion is pre-stretched, the enclosing mechanism always fitting the rotating mechanism when the rotating mechanism is rotated to different angles.

2. The electronic device according to claim 1, wherein the second body comprises a second display portion, wherein the flexible display screen is disposed between the first display portion and the second display portion.

3. The electronic device according to claim 1, wherein the second body comprises a keyboard input apparatus, wherein the flexible display screen is arranged on a first side of the enclosing mechanism adjacent to the keyboard input apparatus.

4. The electronic device according to claim 1, wherein the second body comprises a keyboard input apparatus and the flexible display screen is arranged on a second side of the enclosing mechanism opposite to the keyboard input apparatus.

5. The electronic device according to claim 1, wherein the flexible display screen comprises a plurality of display assembly, the plurality of display assembly being arranged on the enclosing mechanism, each display assembly having an independent display function.

6. The electronic device according to claim 5, wherein the display assembly is a flexible display assembly.

7. The electronic device according to claim 1, wherein the electronic device is a laptop or a tablet computer.

8. The electronic device according to claim 1 wherein the flexible display screen is arranged on a first side of the enclosing mechanism and facing in a same direction as the first display portion.

9. The electronic device according to claim 8 further comprising a second flexible display screen arranged on a second side of the enclosing mechanism.

10. The electronic device according to claim 1 wherein,
the first body has a first side and a second side and the first display portion is located on the first side;
the second body has a first side and a second side,
the enclosing mechanism has a first side and a second side such that in one position each of the first side of the first body, the first side of the second body and the first side of the enclosing mechanism face in the same direction.

11. The electronic device according to claim 10 wherein the flexible display screen is arranged on the first side of the enclosing mechanism.

12. The electronic device according to claim 10 wherein the flexible display screen is arranged on the second side of the enclosing mechanism.

13. The electronic device according to claim 11 further comprising a second flexible display screen arranged on the second side of the enclosing mechanism.

14. An electronic device comprising: a first body that includes a first display portion, wherein the first display portion has dimensions smaller than the first body; a second body; a rotating mechanism pivotally connecting the first body and the second body; an enclosing mechanism enclosing the rotating mechanism; and a flexible display screen being arranged on the enclosing mechanism and being independent from the first display portion, wherein the enclosing mechanism comprises a first elastic portion and a second inelastic portion, with the flexible display screen being arranged on the second inelastic portion, wherein the enclosing mechanism is fixed between the first body and the second body after the first elastic portion is pre-stretched, the enclosing mechanism always fitting the rotating mechanism when the rotating mechanism is rotated to different angles.

* * * * *